US011104422B1

(12) United States Patent
Alvizures et al.

(10) Patent No.: US 11,104,422 B1
(45) Date of Patent: Aug. 31, 2021

(54) COMPACT AND REDUNDANT METHOD FOR POWERING FLIGHT CONTROL SURFACE FROM WITHIN FUSELAGE

(71) Applicant: The Boeing Company, Chicago, IL (US)

(72) Inventors: Wilfredo Alvizures, Snohomish, WA (US); Randall E. Anderson, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 16/784,545

(22) Filed: Feb. 7, 2020

(51) Int. Cl.
*B64C 13/40* (2006.01)
*B64C 13/30* (2006.01)
*B64C 9/02* (2006.01)

(52) U.S. Cl.
CPC ............... *B64C 13/40* (2013.01); *B64C 9/02* (2013.01); *B64C 13/30* (2013.01)

(58) Field of Classification Search
CPC ......... B64C 13/36; B64C 13/38; B64C 13/40; B64C 13/42; B64C 9/02
See application file for complete search history.

(56) References Cited

U.S. PATENT DOCUMENTS

| 5,082,208 | A |   | 1/1992  | Matich |
|-----------|---|---|---------|--------|
| 5,388,788 | A |   | 2/1995  | Rudolph |
| 5,538,202 | A | * | 7/1996  | Thornburg ............... B64C 13/36 244/215 |
| 7,445,180 | B2 |  | 11/2008 | Plude et al. |
| 9,481,452 | B2 |  | 11/2016 | Lindahl et al. |
| 9,604,717 | B2 |  | 3/2017  | Coffman |
| 9,739,316 | B2 |  | 8/2017  | Schwartz et al. |
| 10,494,083 | B2 |  | 12/2019 | Currie et al. |

FOREIGN PATENT DOCUMENTS

WO    WO-2009020452 A1 *   2/2009   ............... B64C 9/08

* cited by examiner

*Primary Examiner* — Richard G Davis
(74) *Attorney, Agent, or Firm* — Ostrager Chong Flaherty & Broitman P.C.

(57) ABSTRACT

Systems and methods for actuating a control surface which is pivotably coupled to a trailing edge of an aircraft wing. The control surface actuation system has a compact footprint and high capability. The control surface actuation system includes a rotatable torque shaft that is coupled (by means of meshed surfaces) to the control surface so that rotation of the torque shaft by a deflection angle causes the control surface to pivot by an equal deflection angle. Rotation of the torque shaft is actuated by a pair of redundant mutually opposing actuation mechanisms. The redundant actuation mechanisms are situated inside of the fuselage, while the torque shaft is disposed partly inside the fuselage and partly inside the control surface.

20 Claims, 14 Drawing Sheets

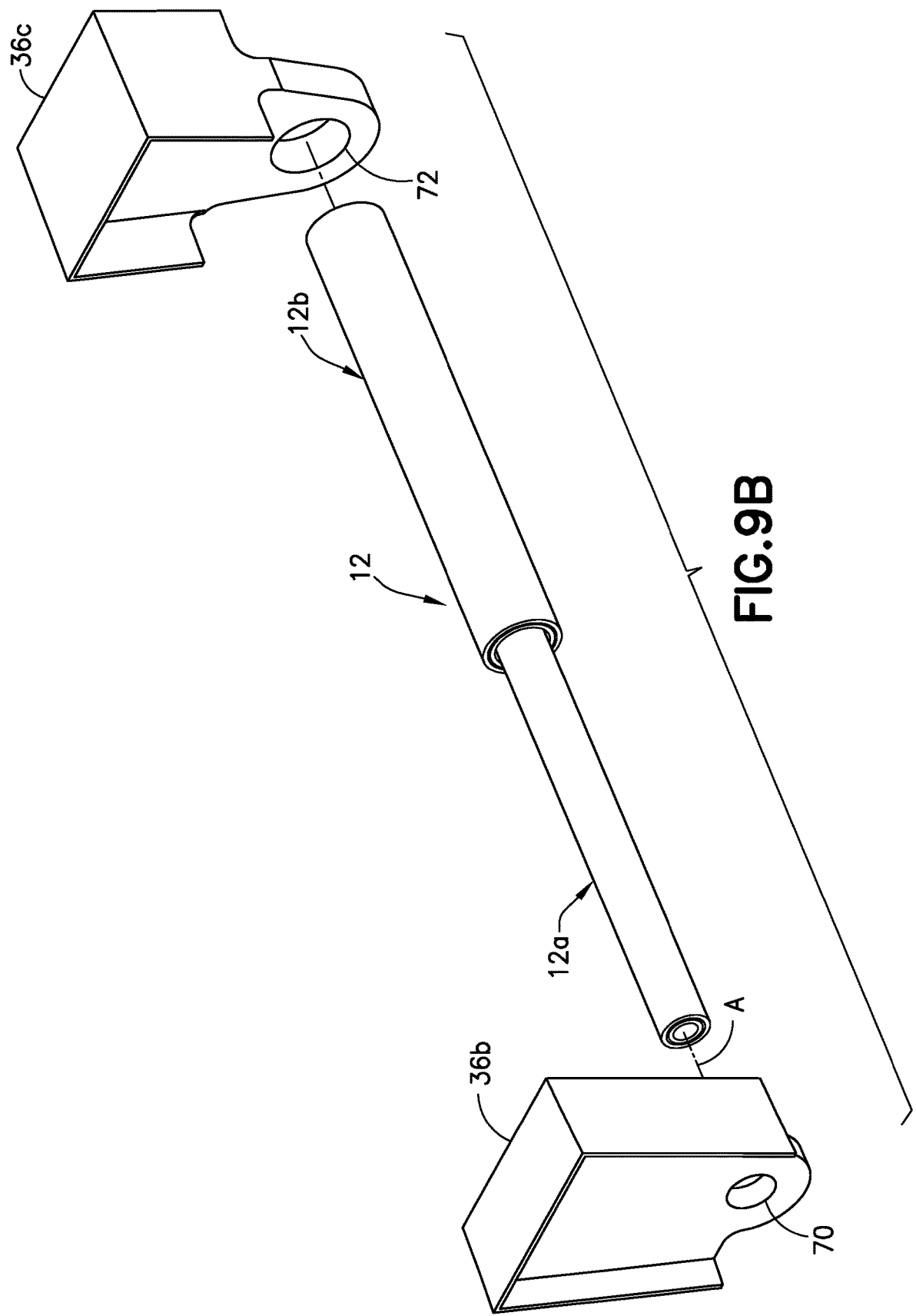

COMPACT AND REDUNDANT METHOD FOR POWERING FLIGHT CONTROL SURFACE FROM WITHIN FUSELAGE

BACKGROUND

The present disclosure relates in general to systems and methods for actuating control surfaces of a vehicle. More particularly, the disclosure relates to control surface actuation systems which are disposed inside the fuselage of an aircraft.

Aerodynamic flight control surfaces, such as flaps, elevators, and rudders, have an aerodynamic cross-sectional profile that is typically formed by connecting an upper skin to a lower skin proximate both the leading edge and the trailing edge of the flight control surface. The wings and stabilizers in high-performance aircraft are thin, that is, the distance between the top and bottom of the outer mold line at the control surface hinge line is small. Thin-wing aircraft create a challenge for spatial integration of actuation control systems with conventional piston-type linear actuators. A method for powering a flight control surface which reduces the footprint of and increases the reliability of such piston-type linear actuators would be a beneficial improvement in the state of the art.

SUMMARY

The subject matter disclosed in some detail below is directed to methods for actuating flight control surfaces by means of a torque shaft drive system which is disposed inside the fuselage of a vehicle (e.g., an aircraft). The torque shaft is partly disposed inside the fuselage and partly disposed outside the fuselage, including a portion disposed inside the control surface. The combination of a torque shaft drive system and a torque shaft will be collectively referred to herein as a "control surface actuation system". The control surface actuation system disclosed herein is configured to provide a compact footprint and high capability. Rotation of the torque shaft is actuated by a pair of redundant mutually-opposing actuation mechanisms which are situated inside the fuselage in a partly overlapping spatial relationship.

In accordance with some embodiments, each of the two actuation mechanisms is a piston-type linear actuator which is operatively coupled to the torque shaft by means of a respective crank arm that may be splined to or fastened to the torque shaft. Each crank arm converts displacement of the associated piston-type linear actuator into rotation of the torque shaft. Each crank arm is capable of driving the control surface independently to provide drive system redundancy. When the actuation mechanisms are moved in opposite directions concurrently (one extends and the other retracts), the crank arms rotate in the same direction. Both actuation mechanisms are balanced to provide equal retraction and extension capabilities. When both actuation mechanisms are fully functional, one actuation mechanism pushes one crank arm while the other actuator mechanism pulls the other crank arm, thereby causing the torque shaft to rotate and the control surface to deflect to a commanded angle. The control surface actuation system proposed herein further includes a pair of reaction links which are coupled to a bulkhead by means of respective kick links to maintain a load loop. The pair of reaction links partly overlap each other to maintain a very compact package that allows for use of this concept in several instances where space is limited and a fairing is not wanted. In addition, each reaction link is pivotably coupled to the torque shaft at two locations to stabilize the associated actuation mechanism.

Although various embodiments of systems and methods for actuating a flight control surface will be described in some detail below, one or more of those embodiments may be characterized by one or more of the following aspects.

One aspect of the subject matter disclosed in detail below is a system for driving rotation of a torque shaft, the system comprising: a first linear actuator comprising a first cylinder and a first piston rod end which is displaceable relative to the first cylinder; a first crank arm which is pivotably coupled (for example, by means of a pivot joint) to the first piston rod end and coupled to drive rotation of the torque shaft; a first reaction link which is pivotably coupled (for example, by means of a rotary bearing) to the torque shaft and to the first cylinder; a second linear actuator comprising a second cylinder and a second piston rod end which is displaceable relative to the second cylinder; a second crank arm which is pivotably coupled to the second piston rod end and coupled to drive rotation of the torque shaft; and a second reaction link which is pivotably coupled to the torque shaft and to the second cylinder. The first reaction link partly overlaps the second reaction link, thereby reducing the footprint of the actuation system. The linear actuators, crank arms, and reactions links are disposed within a fuselage of the aircraft.

Another aspect of the subject matter disclosed in detail below is a method for driving rotation of a torque shaft, the method comprising: (a) rotatably coupling a first reaction link to the torque shaft at first and second axial locations; (b) coupling the first reaction link to a bulkhead by way of a first kick link; (c) rotatably coupling a second reaction link to the torque shaft at third and fourth axial locations, wherein the third axial location is between the first and second axial locations, and the second axial location is between the third and fourth axial locations; (d) coupling the second reaction link to the bulkhead by way of a second kick link; (e) pivotably coupling a first cylinder of a first linear actuator to the first reaction link; (f) coupling one end of a first crank arm to the torque shaft at a fifth axial location between the second and third axial locations; (g) pivotably coupling another end of the first crank arm to a first piston rod end of the first linear actuator; (h) pivotably coupling a second cylinder of a second linear actuator to the second reaction link; (i) coupling one end of a second crank arm to the torque shaft at a sixth axial location between the second and fifth axial locations; (j) pivotably coupling another end of the second crank arm to a second piston rod end of the second linear actuator; and (k) controlling the first and second linear actuators so that the first linear actuator extends while the second linear actuator retracts, thereby causing the first and second crank arms to rotate in a same direction and the torque shaft to rotate A further aspect of the subject matter disclosed in detail below is an aircraft comprising a fuselage comprising a bulkhead, an airfoil-shaped member attached to the fuselage, a control surface pivotably coupled to the airfoil-shaped member, and a control surface actuation system operatively coupled to the control surface, wherein the control surface actuation system comprises a torque shaft which is coupled to drive rotation of the control surface, and a torque shaft drive system which is coupled to drive rotation of the torque shaft. The torque shaft drive system comprises: (a) a torque shaft which is coupled to drive rotation of the control surface; (b) a first linear actuator comprising a first cylinder and a first piston rod end which is displaceable relative to the first cylinder; (c) a first crank arm which is pivotably coupled to the first piston rod end and coupled to drive rotation of the torque shaft; (d) a first reaction link which is pivotably coupled to the torque shaft and to the first cylinder; (e) a second linear actuator comprising a second cylinder and a second piston rod end which is displaceable relative to the second cylinder; (f) a second crank arm which is pivotably coupled to the second piston rod end and coupled to drive rotation of the torque shaft; (g) a second reaction link which is pivotably coupled to the torque shaft and to the second cylinder; (h) a first kick link which is pivotably coupled to the first reaction link and to the bulkhead; and (i) a second kick link which is pivotably coupled to the second reaction link and to the bulkhead. The first and second linear actuators, first and second crank arms, first and second reactions links, and first second kick links are disposed inside the fuselage. The aircraft may further comprise a flight control system configured to send commands for controlling the first and second linear actuators so that the first linear actuator extends while the second linear actuator retracts, thereby causing the first and second crank arms to rotate in a same direction Other aspects of systems and methods for actuating a flight control surface are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 4A is a diagram showing an end view of a splined torque shaft meshed with a splined opening formed in the front spar of a control surface in accordance with one embodiment.

FIG. 9B is a diagram representing an exploded view of the subassembly depicted in FIG. 9A.

Reference will hereinafter be made to the drawings in which similar elements in different drawings bear the same reference numerals.

DETAILED DESCRIPTION

Illustrative embodiments of systems and methods for actuating a flight control surface are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The following detailed description discloses an embodiment of a compact and redundant control surface actuation system suitable for actuating deflection of a flap pivotably coupled to the trailing edge of a wing. However, similarly designed control surface actuation systems may be used to actuate deflection of other types of control surfaces, such as an elevator pivotably coupled to the trailing edge of a horizontal stabilizer, a rudder pivotably coupled to the trailing edge of a vertical stabilizer, or any other control disposed situated in proximity to the fuselage of the aircraft. A control surface is a candidate for actuation by a system disposed inside the fuselage provided that the aircraft design allows the control surface to be coupled to the intra-fuselage actuation system by means of a torque shaft.

Figure 1:
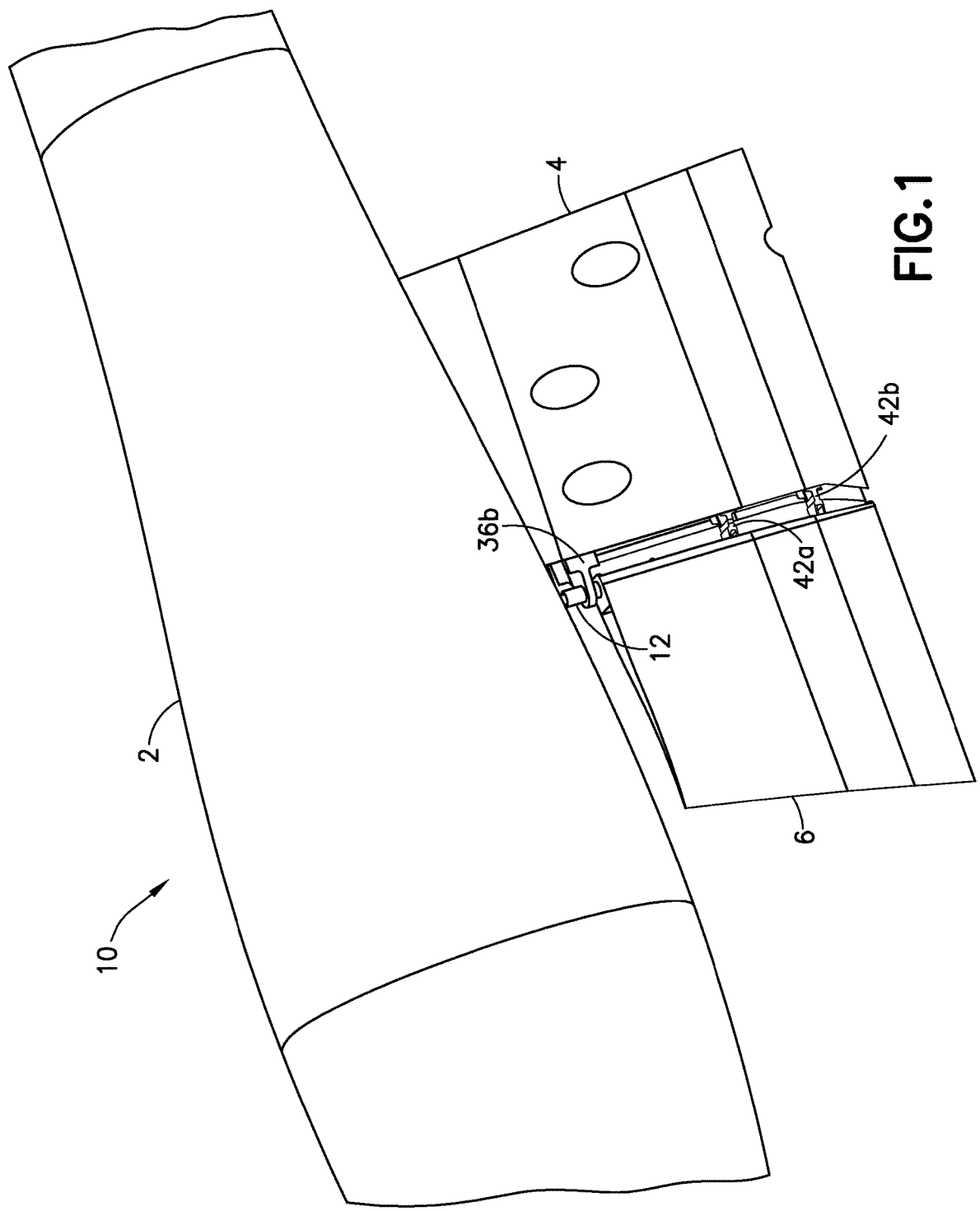
FIG. 1 is a diagram representing a three-dimensional view of portions of an aircraft having a control surface pivotably coupled to a trailing edge of a wing and having a control surface actuation system disposed inside the fuselage of the aircraft.

FIG. 1 shows a three-dimensional view of portions of an aircraft 10 that includes a fuselage 2 and a wing 4. In addition, the aircraft 10 includes a control surface 6 which is pivotably coupled (by means of hinges) to a trailing edge of wing 4. FIG. 1 shows two hinge fittings 42a and 42b. The aircraft 10 further includes a control surface actuation system that controls the angular position of the control surface 6 relative to the wing 4. The control surface actuation system includes a torque shaft 12, which is disposed partly inside the fuselage 2 and partly inside the control surface 6. The torque shaft 12 is rotatably coupled to and supported by a torque shaft support fitting 36b (and other torque shaft support fittings not shown in FIG. 1). The control surface actuation system further includes a torque shaft drive system (not visible in FIG. 1, but see torque shaft drive system 8 in FIGS. 2 and 3), which is disposed inside the fuselage 2. The torque shaft 12 drives rotation (angular deflection) of the control surface 6; the torque shaft drive system 8 drives rotation of the torque shaft 12.

Figure 2:
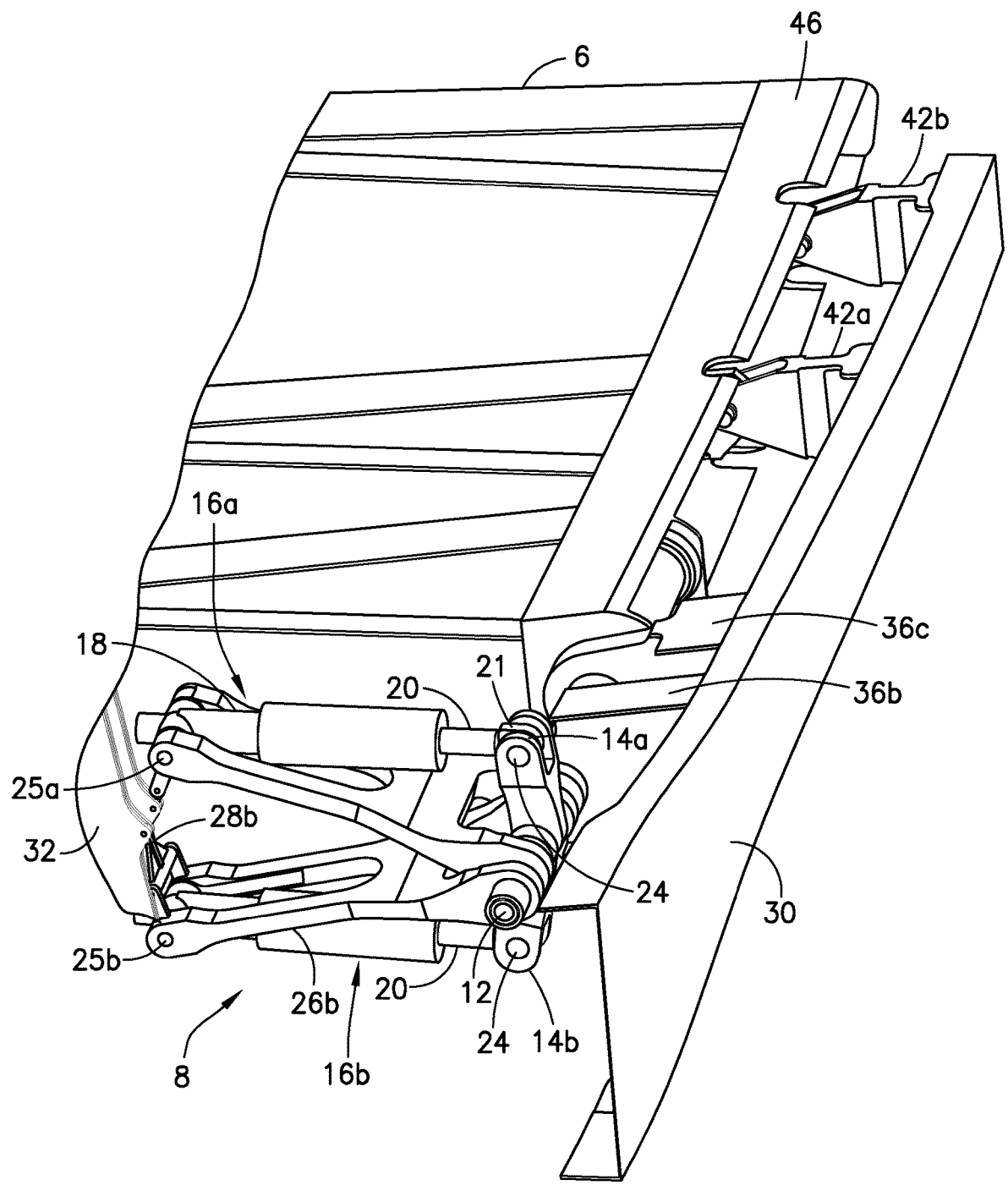
FIG. 2 is a diagram representing a three-dimensional view of an assembly including a control surface actuation system (having two manifolds not shown), a portion of a control surface controlled by the control surface actuation system, and various aircraft components which support the control surface and the control surface actuation system in accordance with one embodiment.

FIG. 2 shows a three-dimensional view of an assembly that includes a torque shaft 12, a torque shaft drive system 8, a control surface 6, and various aircraft components which provide structural support in accordance with one embodiment of the aircraft 10 depicted in FIG. 1. The aircraft 10 further includes a bulkhead 32 which is installed inside the fuselage 2. The torque shaft drive system 8 is coupled to the bulkhead 32 by kick links 28a and 28b (only kick link 28b is visible in FIG. 2). The control surface 6 is pivotably coupled to a rear spar 30 of the wing 4 by means of hinge fittings 42a and 42b. The torque shaft 12 drives the control surface 6 to pivot about a pair of hinges formed in part by the hinge fittings 42a and 42b. Ideally, the axes of the hinges and the axis of rotation of the torque shaft 12 are coaxial so that control surface 6 pivots and torque shaft 12 rotates about the same axis.

Figure 5:
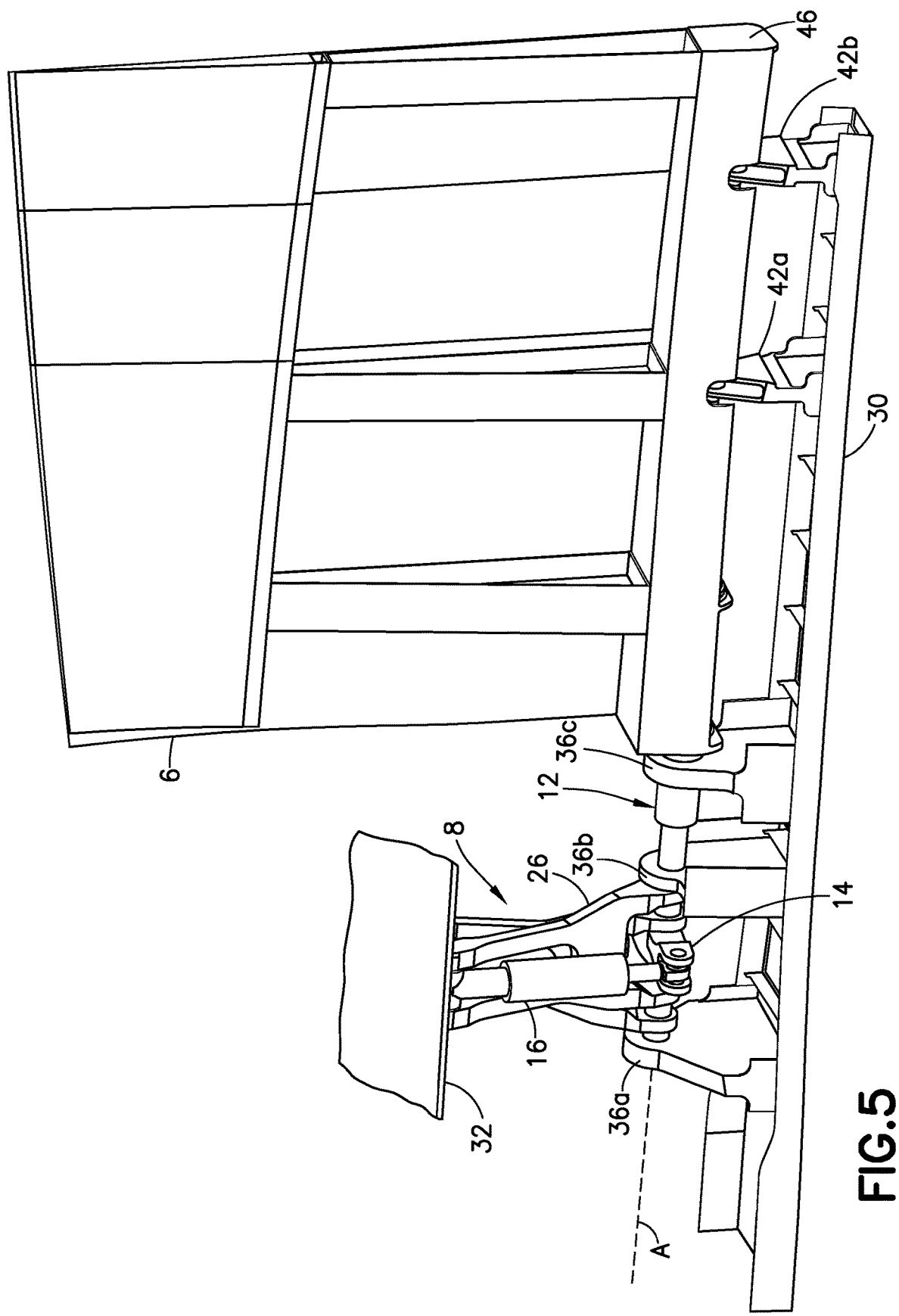
FIG. 5 is a diagram representing a three-dimensional view of the assembly depicted in section in FIG. 4.

The aircraft components which support the torque shaft 12 include three torque shaft support fittings 36a-36c, two of which are shown in FIG. 2 (torque shaft support fitting 36a is shown in FIG. 5). Each of the torque shaft support fittings 36a-36c is attached to the rear spar 30 of the wing 4. The torque shaft support fittings 36a-36c have respective openings in which respective bearings (not shown in the drawings) are seated. The centers of the openings in the torque shaft support fittings 36a-36c are arranged along a line that is also the axis of rotation of the torque shaft 12.

In addition, the front spar 46 of the control surface 6 is configured with splined openings that receive respective splined portions of the torque shaft 12. (One example of such splining will be described in some detail later with reference to FIG. 4A.) The splines (not shown in FIG. 2) on the surface of the torque shaft 12 match the splines of the splined openings (not shown in FIG. 2), so that every incremental rotation of torque shaft 12 produces an equal incremental change in the angular position (hereinafter "deflection position") of the control surface 6.

The torque shaft 12 is driven to rotate by the torque shaft drive system 8. The torque shaft drive system 8 includes two redundant mutually-opposed torque shaft drive mechanisms which are coupled to the torque shaft 12 and to the bulkhead 32. Each redundant torque shaft drive mechanism includes a respective crank arm 14a or 14b, a respective piston-type linear actuator 16a or 16b, a respective reaction link 26a or 26b, and a respective kick link 28a or 28b (kick link 28a is not visible in FIG. 2, but see FIG. 3). The two torque shaft drive mechanisms partly overlap, which technical feature ensures that the control surface actuation system has a small footprint.

More specifically, the first torque shaft drive mechanism includes a piston-type linear actuator 16a (for example, a hydraulic actuator or a pneumatic actuator) comprising a cylinder 18, a piston (not visible in FIG. 2) inside the cylinder 18, and a piston rod 20 extending from the piston and having a piston rod end 21. The piston rod end 21 is displaceable relative to the cylinder 18 between retracted and extended positions. The first torque shaft drive mechanism further includes a crank arm 14a which is pivotably coupled to piston rod end 21 of piston-type linear actuator 16a by a pivot joint which is formed in part by a pivot pin 24. The crank arm 14a is also coupled (for example, by means of meshed splines or a cross bolt) to drive rotation of the torque shaft 12. The first torque shaft drive mechanism further includes a reaction link 26a which is pivotably coupled (for example, by means of a rotary bearing) to the torque shaft 12 and which is pivotably coupled (for example, by means of a pivot joint 25a) to cylinder 18 of piston-type linear actuator 16a. The first torque shaft drive mechanism further includes a kick link 28a (not visible in FIG. 2, but see FIG. 3) which is pivotably coupled (for example, by means of a pivot joint) to reaction link 26a and which is pivotably coupled (for example, by means of a pivot joint) to a kick link attachment lug 34 which is integrally formed with the bulkhead 32.

Similarly, the second torque shaft drive mechanism includes a piston-type linear actuator 16b (for example, a hydraulic actuator or a pneumatic actuator) comprising a cylinder 18, a piston (not visible in FIG. 2) inside the cylinder 18, and a piston rod 20 having a piston rod end 21. Again piston rod end 21 is displaceable relative to cylinder 18 of piston-type linear actuator 16b between retracted and extended positions. The second torque shaft drive mechanism further includes a crank arm 14b which is pivotably coupled to piston rod end 21 by a pivot joint formed in part by a pivot pin 24. The crank arm 14b is also coupled (for example, by means of meshed splines or a cross bolt) to drive rotation of the torque shaft 12. The second torque shaft drive mechanism further includes a reaction link 26b which is pivotably coupled (for example, by means of a rotary bearing) to the torque shaft 12 and which is pivotably coupled (for example, by means of a pivot joint 25b) to cylinder 18 of piston-type linear actuator 16b. The second torque shaft drive mechanism further includes a kick link 28b which is pivotably coupled (for example, by means of a pivot joint) to reaction link 26b and which is pivotably coupled (for example, by means of a pivot joint) to a kick link attachment lug 34 which is integrally formed with the bulkhead 32.

Figure 3:
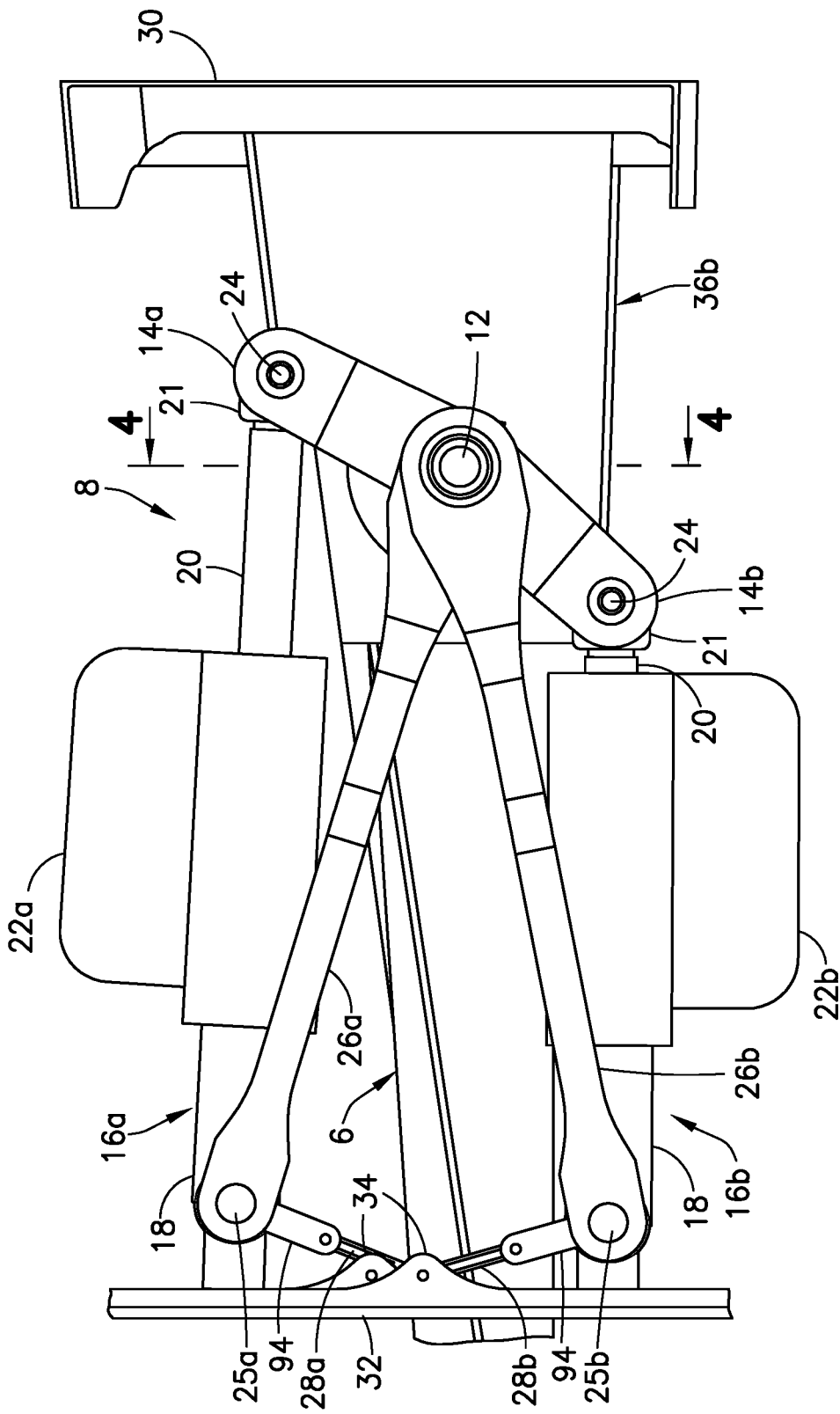
FIG. 3 is a diagram representing a side view of the assembly depicted in FIG. 2 with a pair of manifolds added.

FIG. 3 is a diagram representing a side view of the assembly depicted in FIG. 2 with a pair of manifolds 22a and 22b added. Both piston-type linear actuators 16a and 16b are balanced to provide equal retraction and extension capabilities. FIG. 3 shows a situation in which piston-type linear actuator 16a is extended and piston-type linear actuator 16b is retracted. Conversely, piston-type linear actuator 16a may be retracted while piston-type linear actuator 16b is extended. The deflection angle of the control surface 6 is a function of the angular positions of the crank arms 14a and 14b. The change in deflection angle of the control surface 6 will be equal to the change in angular position of the crank arms 14a and 14b.

Figure 11:
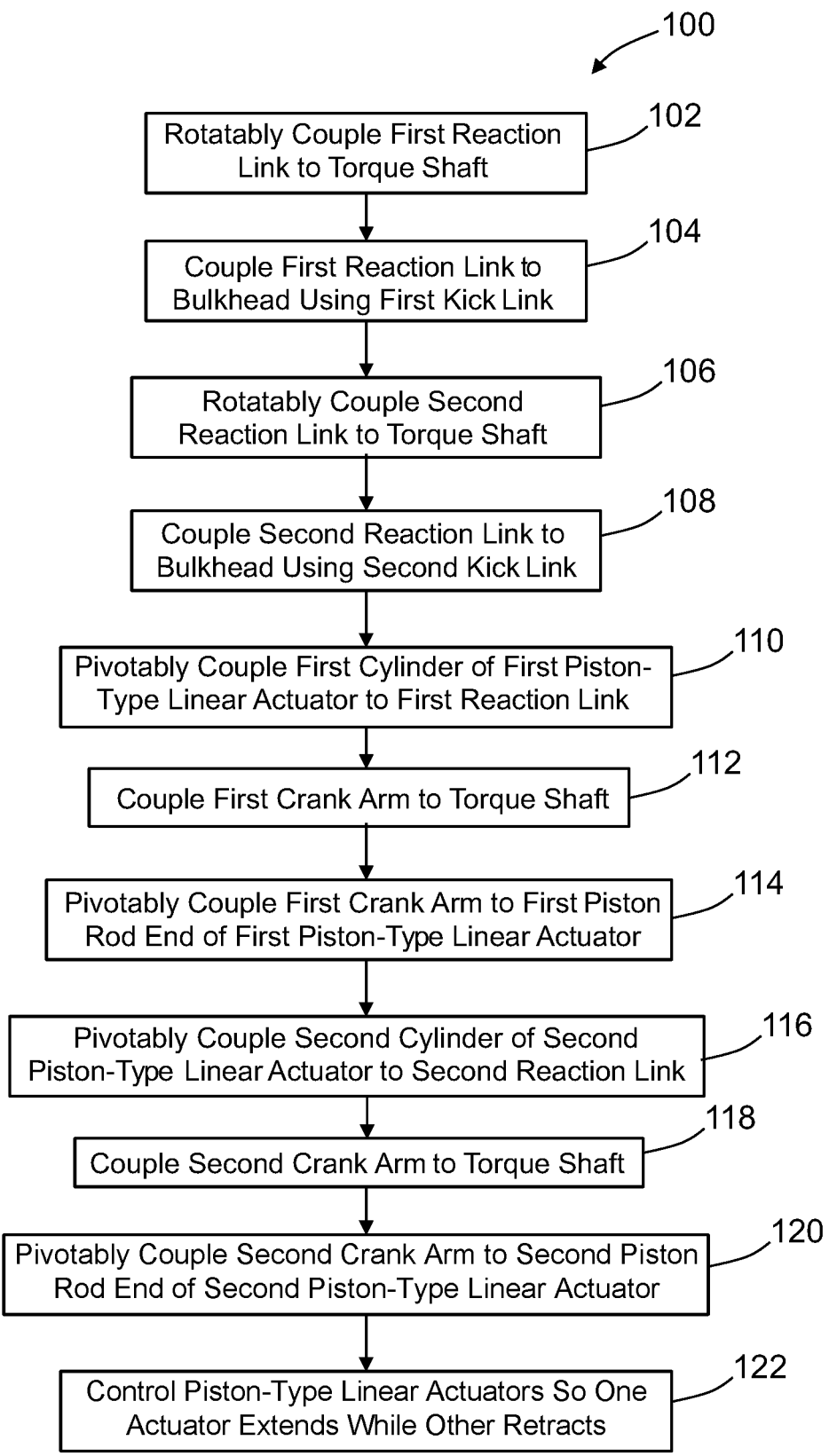
FIG. 11 is a flowchart identifying steps of a method for driving rotation of a torque shaft in accordance with one embodiment.

As depicted in FIG. 3, the first torque shaft drive mechanism further includes a manifold 22a which determines the state of piston-type linear actuator 16a by controlling the supply of fluid into chambers inside the cylinder 18 of piston-type linear actuator 16a in response to commands from a flight control system (not shown in FIG. 2, but see flight controller 40 in FIG. 11). The manifold 22a is mounted to the cylinder 18 of piston-type linear actuator 16a. The internal components of manifold 22a allow pressures in the chambers of the cylinder 18 to be changed such that piston-type linear actuator 16a may be extended or retracted. Similarly, the second torque shaft drive mechanism further includes a manifold 22b which determines the state of piston-type linear actuator 16b by controlling the supply of fluid into the chambers of cylinder 18 of piston-type linear actuator 16b in response to commands from the flight controller 40 (see FIG. 11). The manifold 22b is mounted to the cylinder 18 of piston-type linear actuator 16b. The internal components of manifold 22b allow the pressures in the chambers of the cylinder 18 to be changed such that of the second piston-type linear actuator 16b may be extended or retracted.

In accordance with one embodiment, each of piston-type linear actuators 16a and 16b is a hydraulic actuator. The manifold 22a is configured with solenoid valves which may be selectively opened or closed such that a fluid moving in manifold 22a may control the position of the piston inside the cylinder 18 of piston-type linear actuator 16a. At the same time, manifold 22b controls the position of the piston inside the cylinder 18 of piston-type linear actuator 16b. The piston rods 20 of piston-type linear actuators 16a and 16b are operatively coupled to the torque shaft 12 by means of crank arms 14a and 14b respectively. The crank arms 14a and 14b may be splined to or fastened to the torque shaft 12.

The crank arms 14a and 14b convert displacement of the piston-type linear actuators 16a and 16b into rotation of the torque shaft 12. When one linear actuator is extended and the other linear actuator is retracted, the crank arms 14a and 14b rotate in the same direction. Both actuation mechanisms are balanced to provide equal retraction and extension capabilities. Thus, each crank arm 14a and 14b is capable of driving the control surface 6 independently to provide drive system redundancy. When both actuation mechanisms are fully functional, one actuation mechanism pushes one crank arm while the other actuator mechanism pulls the other crank arm, thereby causing the torque shaft 12 to rotate and the control surface 6 to deflect. The reaction links 26a and 26b and the kick links 28a and 28b transfer reaction loads from the torque shaft 12 to the bulkhead 32 during control surface deflection.

Figure 4:
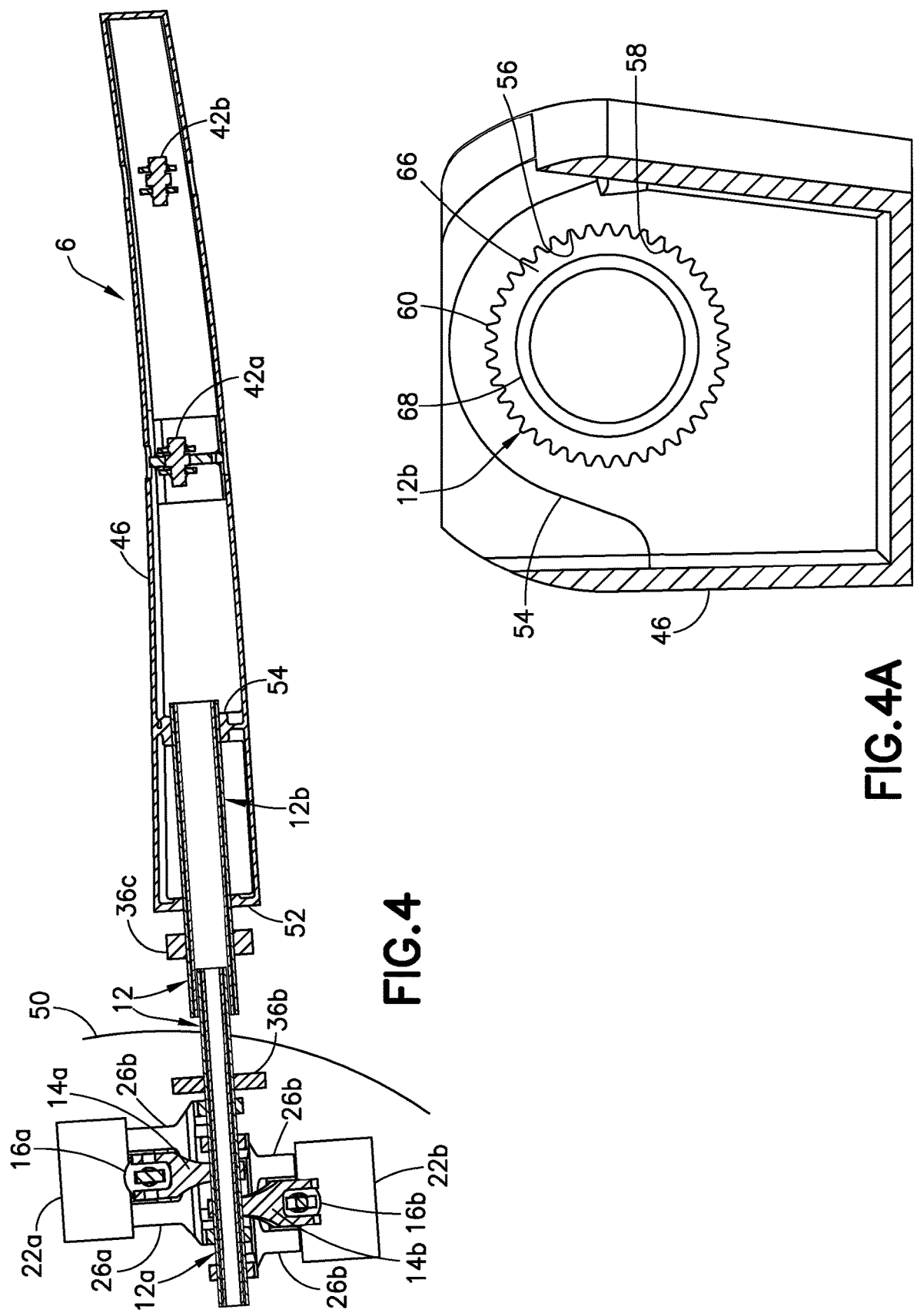
FIG. 4 is a diagram representing a sectional view of the assembly depicted in FIG. 3, the location of the section plane being indicated by line 4-4 seen in FIG. 3. The section plane is parallel to and intersects the axis of rotation of the torque shaft.

FIG. 4 is a diagram representing a sectional view of the assembly depicted in FIG. 3, the location of the section plane being indicated by section line 4-4 in FIG. 3. The section plane is parallel to and intersects the axis of rotation of the torque shaft 12. Because each crank arm is axially centered with respect to the associated reaction link, the axial offset of crank arms 14a and 14b means that the reaction links 26a and 26b overlap only partially. The theoretical outer mold line 50 of the fuselage 2 is indicated by an arc in FIG. 4. As seen in FIG. 4, the entire assembly of the torque shaft drive system 8 is disposed inside the fuselage 2, whereas the torque shaft 12 is partly disposed inside the fuselage 2 and partly disposed inside the control surface 6.

As seen in FIG. 4, the torque shaft 12 includes an inboard torque shaft segment 12a and an outboard torque shaft segment 12b. Each of torque shaft segments 12a and 12b has a tube-within-tube configuration. The inboard torque shaft segment 12a is rotatably coupled to and supported by torque shaft support fitting 36b (e.g., by means of a bearing not shown in FIG. 4). The outboard torque shaft segment 12b is coupled to the front spar 46 of control surface 6 (e.g., by splines as seen in FIG. 4A) and is rotatably coupled to torque shaft support fitting 36c (e.g., by means of a bearing not shown in FIG. 4). The bearings disposed in torque shaft support fittings 36a-36c are configured to support the torque shaft 12 while allowing the torque shaft 12 to rotate.

As seen in FIG. 4, the torque shaft support fitting 36b (and also the torque shaft support fitting 36a not shown in FIG. 4) is disposed inside the fuselage 2 (as represented by outer mold line 50), whereas torque shaft support fitting 36c is disposed outside the fuselage 2. A major portion of inboard torque shaft segment 12a is disposed inside fuselage 2, while one end of inboard torque shaft segment 12a projects out of fuselage 2 and into one end of second outboard torque shaft segment 12b. The overlapping end portions of the torque shaft segments 12a and 12b are fastened together by a cross bolt (not shown in FIG. 4, but see cross bolt 96b in FIG. 11).

Figure 9A:
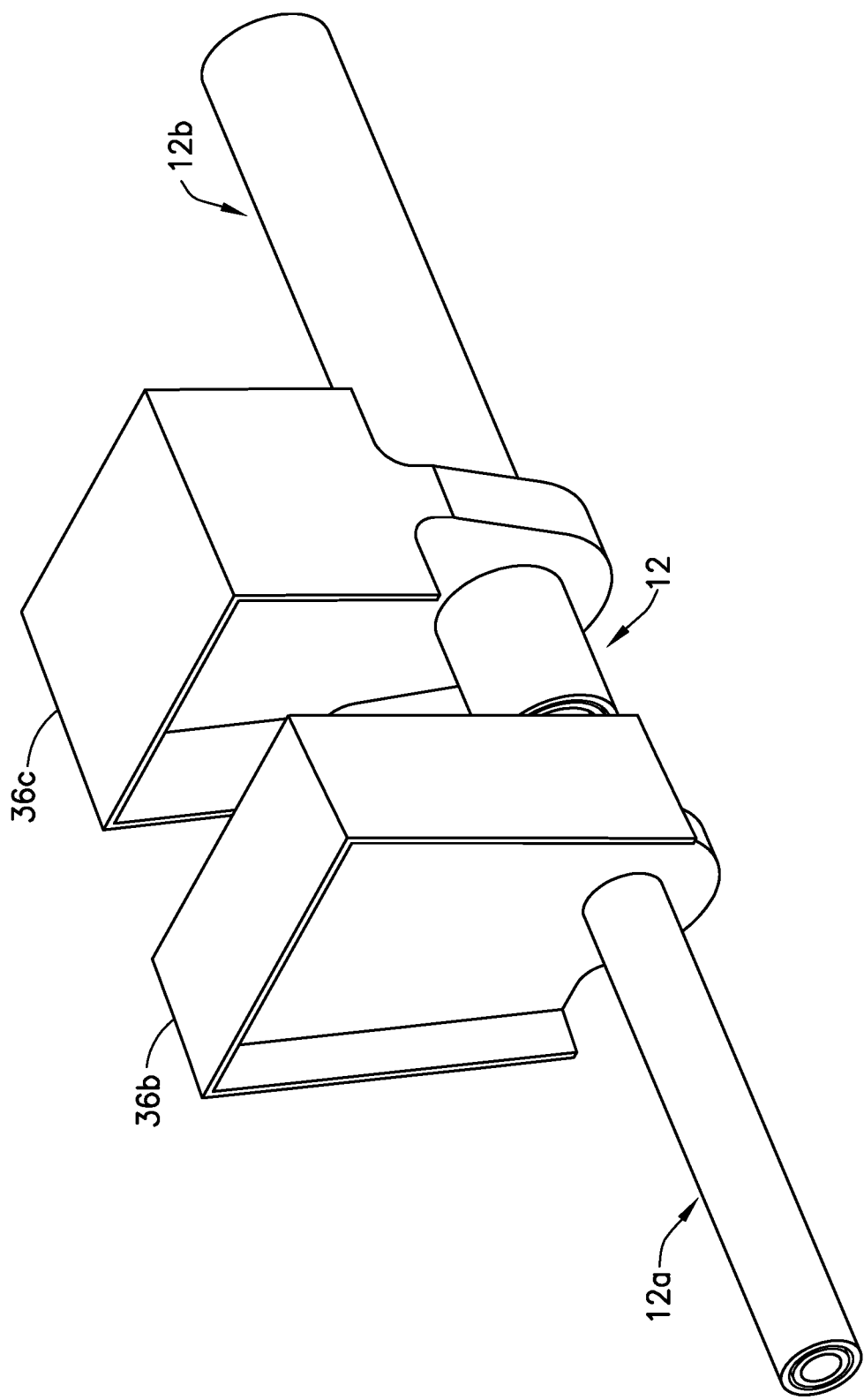
FIG. 9A is a diagram representing a three-dimensional view of a subassembly that includes a torque shaft supported by a pair of torque shaft support fittings in accordance with one proposed implementation.

FIG. 9A is a diagram representing a three-dimensional view of a subassembly that includes a torque shaft 12 supported by a pair of torque shaft support fittings 36b and 36c (and other torque shaft support fittings not shown) in accordance with one proposed implementation. FIG. 9B is a diagram representing an exploded view of the subassembly depicted in FIG. 9A. The inboard torque shaft segment 12a is passed through an opening 70 formed in torque shaft support fitting 36b, whereas outboard torque shaft segment 12b is passed through an opening 72 formed in torque shaft support fitting 36c.

As shown in FIG. 4, the front spar 46 of control surface 6 includes an external torque shaft support wall 52 and an internal torque shaft support wall 54 having respective splined openings which receive and mate with respective pluralities of splines formed on the outer surface of the outboard torque shaft segment 12b. FIG. 4A is a diagram showing an end view of a splined torque shaft meshed with a splined opening 56 formed in the internal torque shaft support wall 54 in accordance with one embodiment. The splined opening 56 has a plurality of inwardly projecting and axially extending splines 58, whereas an end section of the outer tube 66 of outboard torque shaft segment 12b has a plurality of outwardly projecting and axially extending splines 60 which are meshed (interengaged) with splines 58. In addition, the external torque shaft support wall 52 (not shown in FIG. 4A) has a splined opening which is meshed with a second plurality of outwardly projecting splines (not shown in the drawings) formed on the outer surface of the second outboard torque shaft segment 12b. Due to meshing of the splines on torque shaft 12 with the splines inside control surface 6, rotation of torque shaft 12 drives control surface 6 to pivot (deflect). More specifically, outer tube 66 is coupled (e.g., by cross bolts) to an inner tube 68 of outboard torque shaft segment 12b, which in turn is coupled (e.g., by a cross bolt) to the inboard torque shaft segment 12a, thereby effectively coupling control surface 6 to crank arms 14a and 14b. Accordingly, every incremental rotation of crank arms 14a and 14b produces an equal incremental change in the deflection position of control surface 6.

FIG. 5 is a diagram representing a three-dimensional view of the assembly depicted in section in FIG. 4. To avoid cluttered reference numerals, only one piston-type linear actuator 16, one reaction link 26, and one crank arm 14 are indicated. As seen in FIG. 5, the torque shaft support fittings 36a-36c are supported by a rear spar 30. More specifically, torque shaft support fittings 36a-36c are attached to (joined or fastened) or integrally formed with rear spar 30. The torque shaft 12 is rotatably coupled to torque shaft support fittings 36a-36c by bearings (not shown). In addition, the control surface 6 is pivotably coupled to the wing 4 by means of hinges. More specifically, hinge fittings 42a and 42b are pivotably coupled to respective hinge fitting attachment lugs (not visible in FIG. 5) by means of respective pivot joints. The proximal ends of the hinge fittings 42a and 42b are attached to (joined or fastened) or integrally formed to rear spar 30 of wing 4. The hinge fitting attachment lugs are integrally formed with the front spar 46 of control surface 6. The dashed line in FIG. 5 represents the axis of rotation A of the torque shaft 12, which is coaxial with the pivot axis of the control surface 6 (which pivot axis is defined by the aforementioned hinges).

Figure 6:
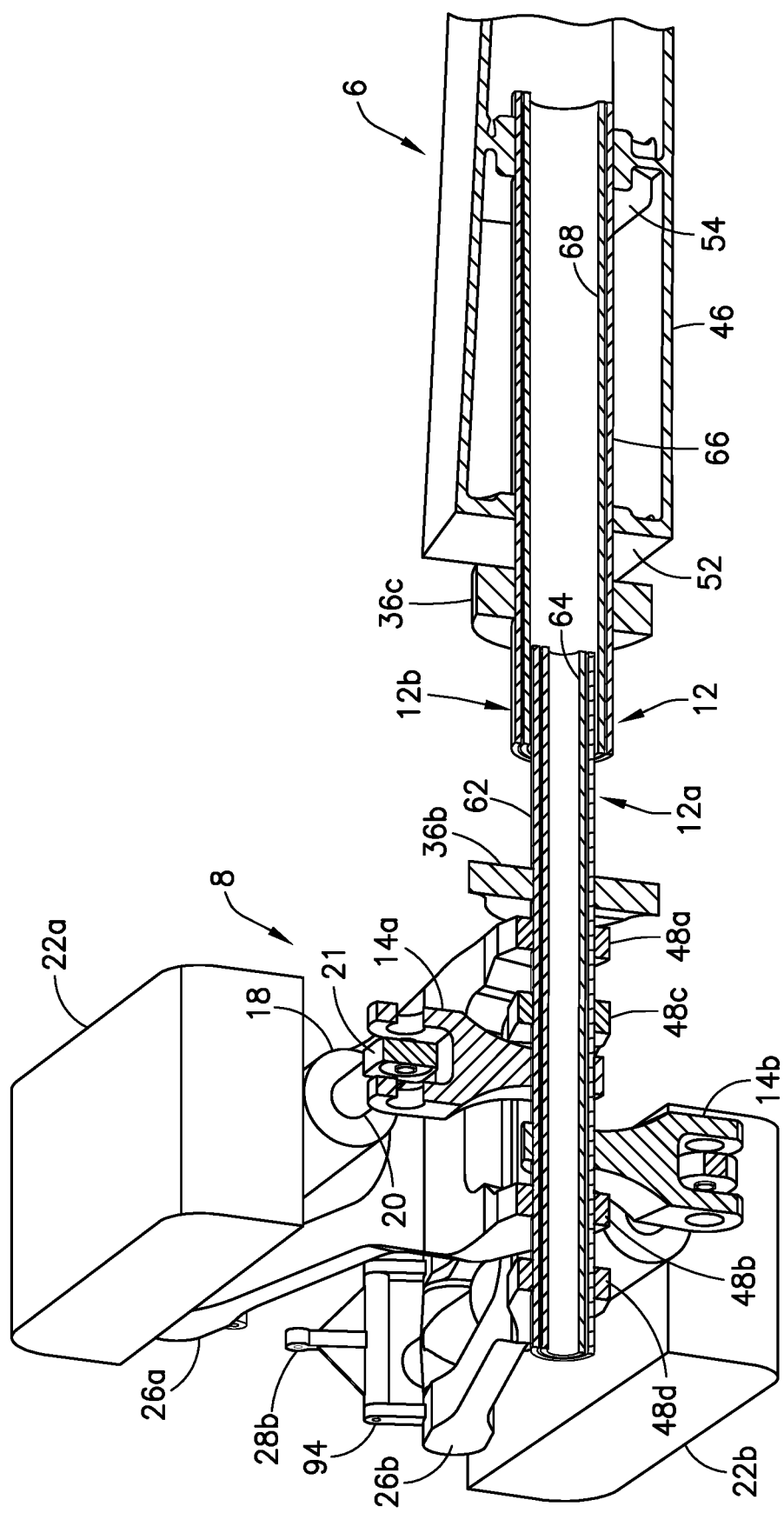
FIG. 6 is a diagram representing a three-dimensional sectional view of the assembly depicted in FIG. 2. In this depiction, the section plane is parallel to and intersects the axis of rotation of the torque shaft, but is perpendicular to the section plane of FIG. 4.

FIG. 6 is a diagram representing a three-dimensional sectional view of the assembly depicted in FIG. 4. In this depiction, the section plane is parallel to and intersects the axis of rotation of the torque shaft 12, but is perpendicular to the section plane of FIG. 4. As seen in FIG. 6, each of the torque shaft segments 12a and 12b has a tube-within-tube configuration. The inboard torque shaft segment 12a includes an outer tube 62 which surrounds an inner tube 64. Similarly, the outboard torque shaft segment 12b includes an outer tube 66 which surrounds an inner tube 68. The end section of inboard torque shaft segment 12a is inserted in an end section of outboard torque shaft segment 12b. These end sections are fastened together by a cross bolt (not shown in FIG. 6, but see cross bolt 96b in FIG. 7).

As seen in FIG. 6, the reaction link 26a is rotatably coupled to the torque shaft 12 at first and second axial locations by means of bearings 48a and 48b; the reaction link 26b is rotatably coupled to the torque shaft 12 at third and fourth axial locations by means of bearings 48c and 48d. The third axial location is between the first and second axial locations; the second axial location is between the third and fourth axial locations. The coupling of the reaction links to the torque shaft at four axial locations provides stabilization of the mechanism.

In addition, the crank arm 14a is coupled to torque shaft 12 at a fifth axial location between the second and third axial locations (in other words, crank arm 14a is between bearings 48b and 48c), while crank arm 14b is coupled to torque shaft 12 at a sixth axial location between the second and fifth axial locations (in other words, crank arm 14b is between bearing 48b and crank arm 14a). Because each crank arm is axially centered with respect to the associated reaction link, the axial offset of crank arms 14a and 14b means that the reaction links 26a and 26b overlap only partially (as best seen in FIG. 4). By having both actuation systems/mechanisms partially overlap each other and connect to the torque shaft through separate cranks, the footprint of the mechanized may be reduced as compared to a redundant system having no overlap.

Figure 6A:
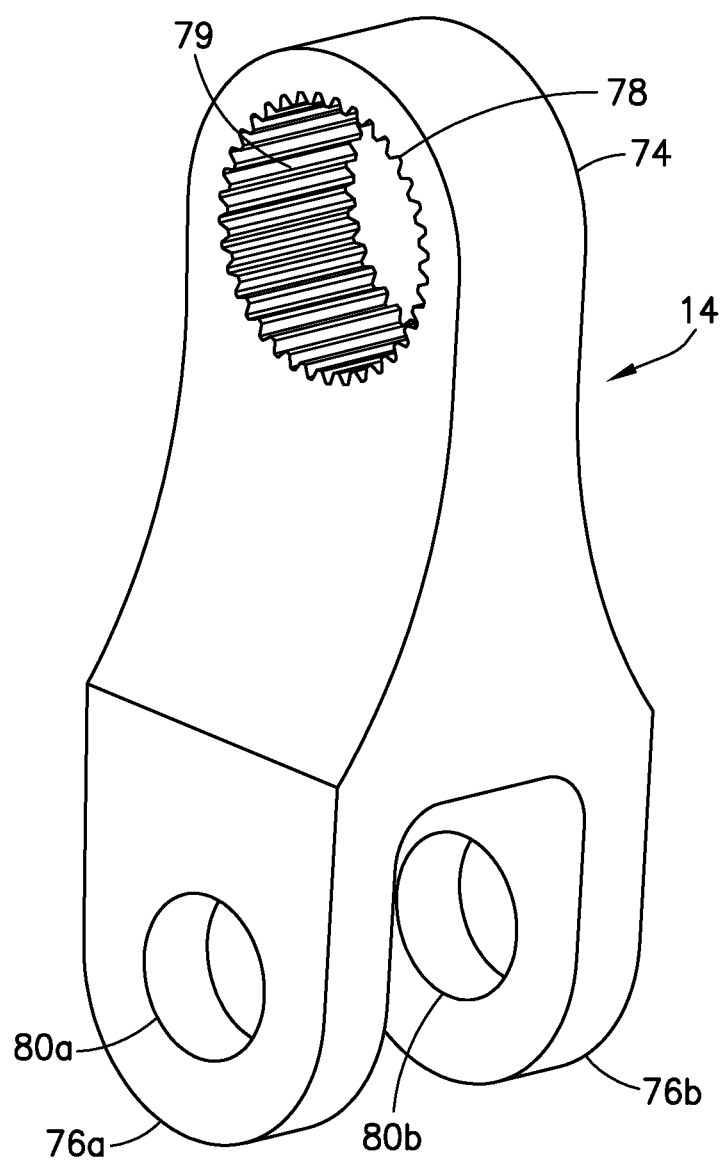
FIG. 6A is a diagram representing a three-dimensional view of a crank arm in isolation.

FIG. 6A is a diagram representing a three-dimensional view of a crank arm 14 in accordance with one proposed implementation. The crank arm 14 includes a stem 74 having an opening 78 with axial splines 79. The inboard torque shaft segment 12a passes through the opening 78 and has matching axial splines which mesh with axial splines 79, thereby coupling the inboard torque shaft segment 12a to the crank arm 14. Accordingly, every incremental rotation of crank arm 14 produces an equal incremental change in the angular position of the inboard torque shaft segment 12a. The crank arm 14 further includes a pair of prongs 76a and 76b which form a clevis. The prongs 76a and 76b have respective openings 80a and 80b which receive a pivot pin for forming a pivot joint that pivotably couples the crank arm 14 to the piston rod end of an associated piston-type linear actuator. The crank arm 14 may be made of a suitable metallic alloy.

Figure 6B:
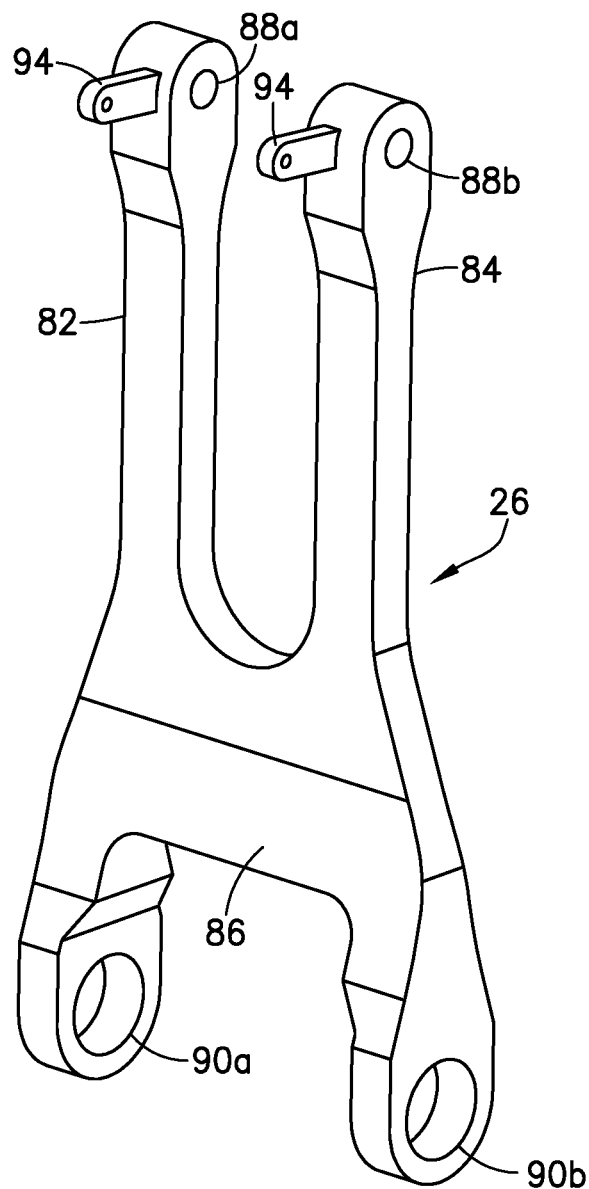
FIG. 6B is a diagram representing a three-dimensional view of a reaction link in isolation.

FIG. 6B is a diagram representing a three-dimensional view of a reaction link 26 in accordance with one proposed implementation. Each reaction link 26 has a left arm 82 and a right arm 84 which are rigidly connected by a cross beam 86. One end of left arm 82 has an opening 88a; one end of the right arm 84 has an opening 88b. The openings 88a and 88b receive bearings which pivotably couple the reaction link to a torque shaft. The other ends of the arms have respective openings 90a and 90b which receive a pivot pin for pivotably coupling the reaction link 26 to a cylinder of an associated piston-type linear actuator. Each reaction link 26 further includes a pair of kick link support prongs 94 which are integrally formed with the other ends of the left and right arms 82 and 84 of the reaction link 26. The associated kick links are pivotably coupled to the kick link support prongs 94. The reaction link 26 may be made of a suitable metallic alloy.

Figure 7:
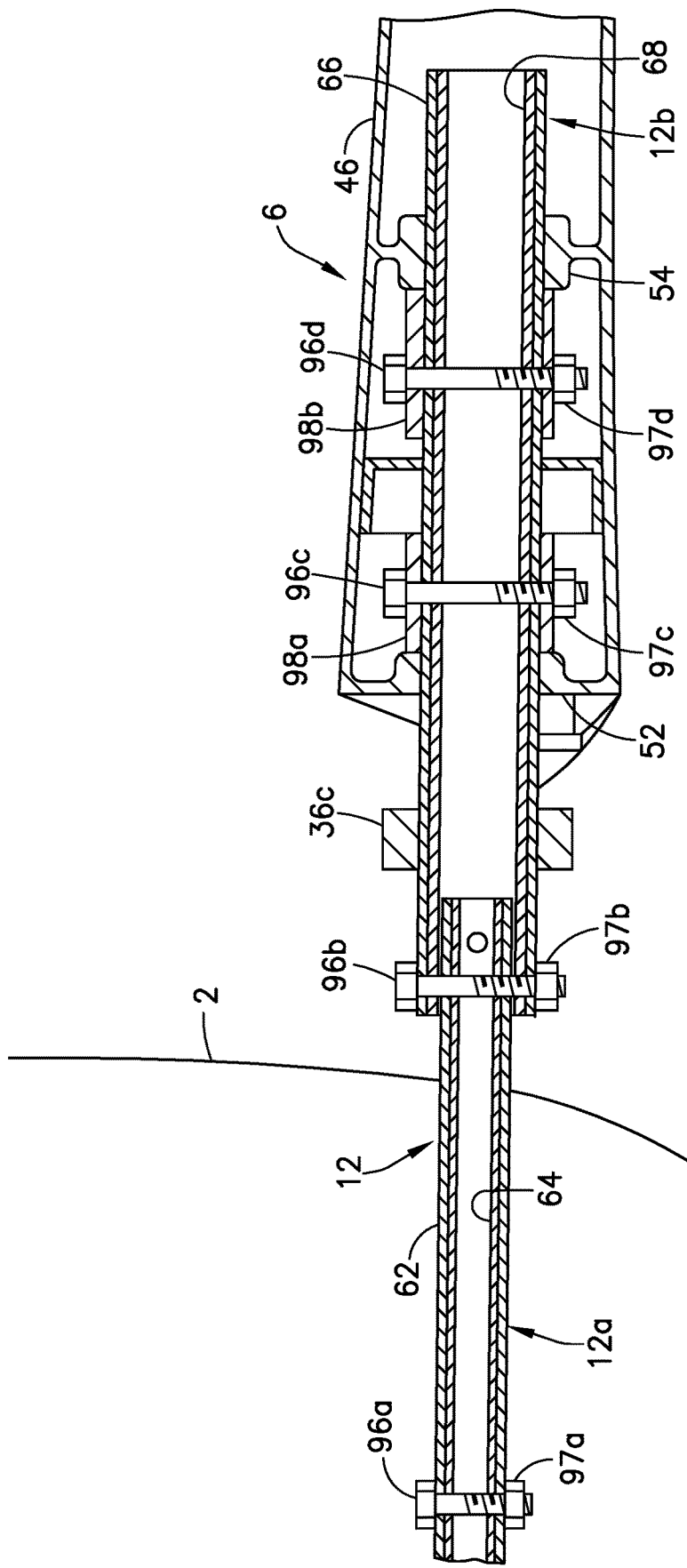
FIG. 7 is a diagram representing a sectional view of a torque shaft coupled to a flight control surface in accordance with one proposed implementation.

FIG. 7 is a diagram representing a sectional view of a torque shaft 12 coupled to a flight control surface 6 in accordance with one proposed implementation. As previously described, the torque shaft 12 includes two torque shaft segments 12a and 12b. One end of inboard torque shaft segment 12a is inserted inside one end of outboard torque shaft segment 12b. Each of the torque shaft segments 12a and 12b has a tube-within-tube configuration which provides fail safety for the actuation system. If either tube fails, the other tube will take over and transfer the load from the torque shaft drive system 8 to the control surface 6.

As seen in FIG. 7, the inboard torque shaft segment 12a includes an outer tube 62 and an inner tube 64. The outer tube 62 and inner tube 64 of inboard torque shaft segment 12a are coupled by means of a cross bolt 96a that passes through aligned holes in the tubes and is held in place by a nut 97a. Similarly, the outboard torque shaft segment 12b includes an outer tube 66 and an inner tube 68. The outer tube 66 and inner tube 68 of outboard torque shaft segment 12b are coupled by means of a cross bolt 96c that passes through aligned holes in the tubes and is held in place by a nut 97c and by means of a cross bolt 96d that passes through aligned holes in the tubes and is held in place by a nut 97d. Each cross bolt has the ability to transfer load from a failed outer tube to the inner tube or from a failed inner tube to the outer tube. The axial position of outboard torque shaft segment 12b relative to the front spar 46 of the control surface 6 is maintained by retention spacers 98a and 98b. Retention spacer 98a spaces cross bolt 96c from external torque shaft support wall 52, while retention spacer 98b spaces cross bolt 96d from internal torque shaft support wall 54.

As further seen in FIG. 7, the end section of inboard torque shaft segment 12a is inserted in an end section of outboard torque shaft segment 12b. These end sections are fastened together by means of a cross bolt 96b that passes through aligned holes in the four tubes (outer tube 62, inner tube 64, outer tube 66, and inner tube 68) and is held in place by a nut 97b. The cross bolt 96b ensures load transfer from inboard torque shaft segment 12a to outboard torque shaft segment 12b.

In the drive system described in detail above, drive system redundancy is provided by two separate actuators and mechanisms attached to the torque shaft via two separate cranks, each crank being capable of driving the control surface. Redundancy is also provided by constructing a torque shaft that is a tube within a tube, each tube being capable of driving the control surface to deflect up or down. Both actuators are balanced to have equal retraction and extension capabilities. In the example depicted in FIG. 7, if outer tube 62 fails, inner tube 64 will transfer load to the outboard torque shaft segment 12b. If the outer tube 66 fails, the inner tube 68 will transfer load to the control surface. Essentially, each segment has its own individual failsafe inner tube. In order for this load to be transferred during failure, at least one of the tubes in each segment must be in good condition to drive the control surface 6.

Figure 8B:
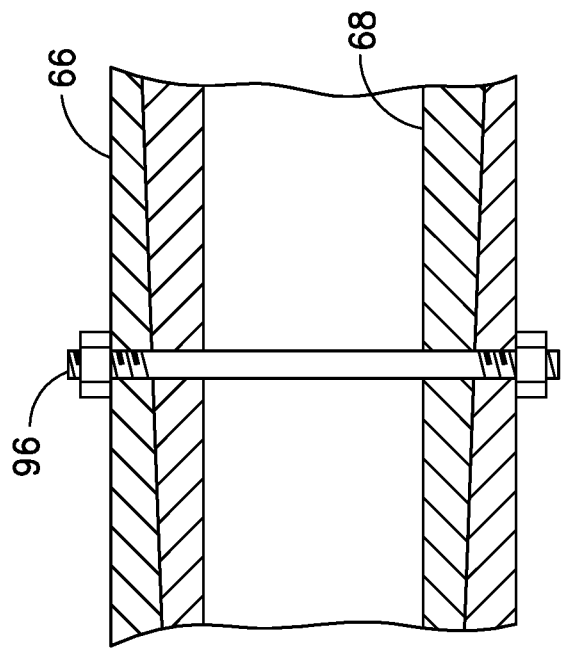
FIG. 8B is a diagram representing a sectional view of a portion of a torque shaft in which gaps between inner and outer tubes are maintained by tapering the tubes.
Figure 8A:
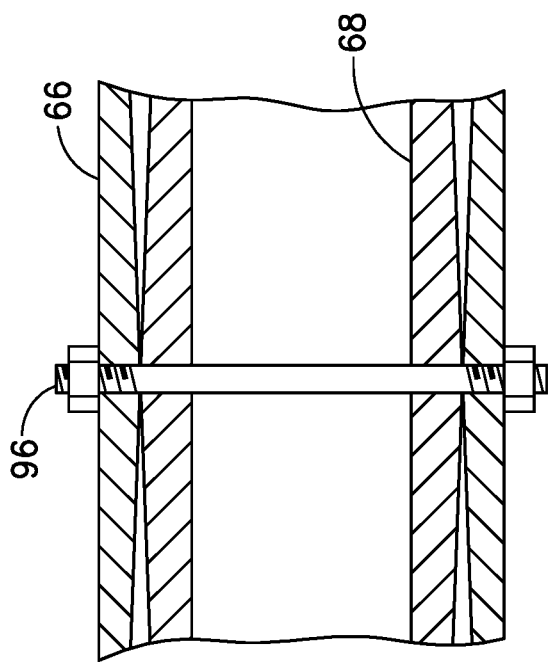
FIG. 8A is a diagram representing a sectional view of a portion of a torque shaft in which gaps between inner and outer tubes are maintained by locally machined boss features along the tube.

In accordance with various embodiments, gaps are provided between the inner and outer tubes of the respective segments. Each gap is a designed-in gap that is used to allow for simple assembly. The gaps may be maintained through several methods. FIG. 8A is a diagram representing a sectional view of a portion of a torque shaft in which gaps between inner tube 68 and outer tube 66 are maintained by locally machined boss features along the tubes. FIG. 8B is a diagram representing a sectional view of a portion of a torque shaft in which gaps between inner tube 68 and outer tube 66 are maintained by tapering the tubes.

For one specific application, all tubes are made of steel in order to meet corrosion resistance and strength specifications. All four tubes could be made of the same material but would need to be different thicknesses to accommodate for the drop in diameter from outer to inner tube in the event of a failure. If the tubes were different materials, the thicknesses across the four tubes could be around the same thickness.

Figure 10:
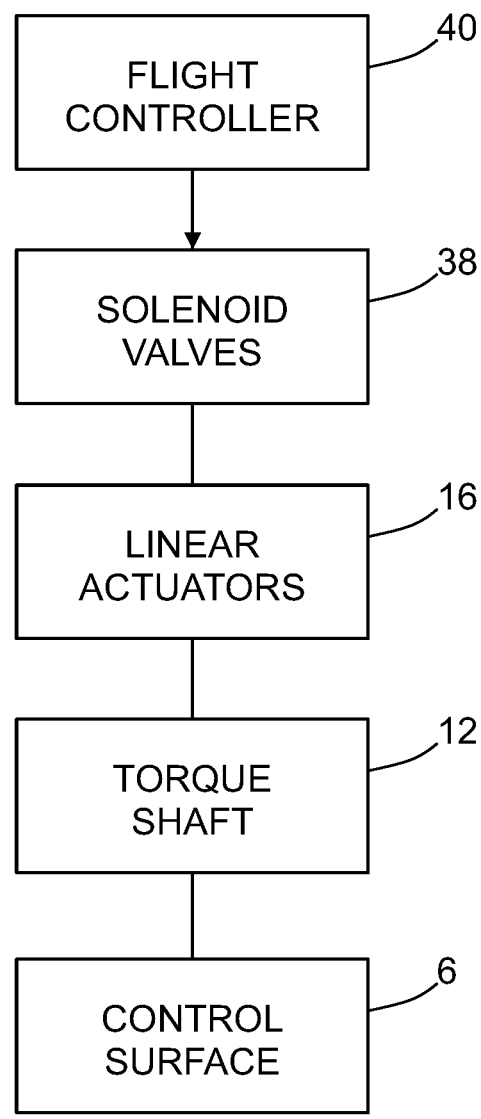
FIG. 10 is a block diagram identifying some components of a primary flight control system in accordance with one embodiment.

FIG. 10 is a block diagram identifying some components of a primary flight control system 1 in accordance with one embodiment. The primary flight control system 1 includes a control surface 6, a torque shaft 12 having a segment coupled to drive rotation of the control surface 6, and a pair of piston-type linear actuators 16 which are independently and redundantly capable of driving rotation of the torque shaft 12. The primary flight control system 1 further includes respective pluralities of solenoid valves 38 which are configurable to control the flow of fluid from a fluid-filled reservoir to the cylinders of the linear actuators 16. In addition, the primary flight control system 1 includes a flight controller 40 which is configured to send commands for controlling the states of the piston-type linear actuators 16 so that as one actuator extends, the other actuator retracts, thereby causing the torque shaft 12 to rotate.

The flight controller 40 may comprise one or more signal or data processing devices. Such devices typically include a processor or a computing device, such as a general-purpose central processing unit, a microcontroller, a reduced instruction set computer processor, an application-specific integrated circuit, a programmable logic circuit, a field-programmable gate array, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to issue electrical signals controlling the states of the solenoid valves. The above examples are exemplary only, and thus are not intended to limit in any way the ordinary definitions and/or meanings of the terms "processor" and "computing device".

FIG. 11 is a flowchart identifying steps of a method 100 for driving rotation of a torque shaft in accordance with one embodiment. The method 100 includes multiple steps for assembling the torque shaft drive system which drives the torque shaft. One end of the first reaction link 26a is rotatably coupled to the torque shaft 12 at first and second axial locations by means of bearings 48a and 48b (step 102). The other end of the first reaction link 26a is coupled to the bulkhead 32 by way of a first kick link 28a (step 104). In addition, one end of the second reaction link 26b is rotatably coupled to the torque shaft 12 at third and fourth axial locations by means of bearings 48c and 48d (step 106). The other end of the second reaction link 26b is coupled to the bulkhead 32 by way of a second kick link 28b (step 108). In addition, the cylinder 18 of the first piston-type linear actuator 16a is pivotably coupled to the first reaction link 26a (step 110). Then one end of the first crank arm 14a is coupled to the torque shaft 12 at a fifth axial location between the second and third axial locations (step 112) and another end of the first crank arm 14a is pivotably coupled to the first piston rod end 21 of the first piston-type linear actuator 16a (step 114). Likewise, the cylinder 18 of the second piston-type linear actuator 16b is pivotably coupled to the second reaction link 26b (step 116). Then one end of the second crank arm 14b is coupled to the torque shaft 12 at a sixth axial location between the second and fifth axial locations (step 118) and another end of the second crank arm 14b is pivotably coupled to the second piston rod end 21 of the second piston-type linear actuator 16b (step 120). During operation, the first and second piston-type linear actuators 16a and 16b are controlled so that the first piston-type linear actuator 16a extends while the second piston-type linear actuator 16b retracts (step 122), thereby causing the first and second crank arms 14a and 14b (and torque shaft 12) to rotate in the same direction.

While systems and methods for actuating a control surface have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. A system for driving rotation of a torque shaft, the system comprising:
    a first linear actuator comprising a first cylinder and a first piston rod end which is displaceable relative to the first cylinder;
    a first crank arm which is pivotably coupled to the first piston rod end and coupled to drive rotation of the torque shaft;
    a first reaction link which is pivotably coupled to the torque shaft and to the first cylinder;
    a second linear actuator comprising a second cylinder and a second piston rod end which is displaceable relative to the second cylinder;
    a second crank arm which is pivotably coupled to the second piston rod end and coupled to drive rotation of the torque shaft; and
    a second reaction link which is pivotably coupled to the torque shaft and to the second cylinder.

2. The system as recited in claim 1, wherein the first reaction link partly overlaps the second reaction link.

3. The system as recited in claim 1, further comprising:
    a first kick link which is pivotably coupled to the first reaction link and to a bulkhead of a vehicle; and
    a second kick link which is pivotably coupled to the second reaction link and to the bulkhead.

4. The system as recited in claim 1, wherein the first crank arm is coupled to the torque shaft at a first axial location and the second crank arm is coupled to the torque shaft at a second axial location.

5. The system as recited in claim 4, wherein the first reaction link is pivotably coupled to the torque shaft at third and fourth axial locations, the second reaction link is pivotably coupled to the torque shaft at fifth and sixth axial locations, the fourth axial location is between the second and sixth axial locations, and the fifth axial location is between the first and third axial locations.

6. The system as recited in claim 1, wherein the torque shaft is coupled to a control surface of a vehicle for driving rotation thereof.

7. The system as recited in claim 6, wherein the first and second linear actuators, first and second crank arms, and first and second reactions links are disposed inside a fuselage of the vehicle.

8. A method for driving rotation of a torque shaft, the method comprising:
   (a) rotatably coupling a first reaction link to the torque shaft at first and second axial locations;
   (b) coupling the first reaction link to a bulkhead by way of a first kick link;
   (c) rotatably coupling a second reaction link to the torque shaft at third and fourth axial locations, wherein the third axial location is between the first and second axial locations, and the second axial location is between the third and fourth axial locations;
   (d) coupling the second reaction link to the bulkhead by way of a second kick link;
   (e) pivotably coupling a first cylinder of a first linear actuator to the first reaction link;
   (f) coupling one end of a first crank arm to the torque shaft at a fifth axial location between the second and third axial locations;
   (g) pivotably coupling another end of the first crank arm to a first piston rod end of the first linear actuator;
   (h) pivotably coupling a second cylinder of a second linear actuator to the second reaction link;
   (i) coupling one end of a second crank arm to the torque shaft at a sixth axial location between the second and fifth axial locations;
   (j) pivotably coupling another end of the second crank arm to a second piston rod end of the second linear actuator; and
   (k) controlling the first and second linear actuators so that the first linear actuator extends while the second linear actuator retracts, thereby causing the first and second crank arms to rotate in a same direction and the torque shaft to rotate.

9. The method as recited in claim 8, further comprising coupling the torque shaft to a control surface of a vehicle for driving rotation thereof.

10. The method as recited in claim 9, wherein coupling the torque shaft to the control surface comprises meshing splines on the torque shaft with mating splines formed in a spar of the control surface.

11. The method as recited in claim 9, wherein the first and second linear actuators, first and second crank arms, and first and second reactions links are disposed inside a fuselage of the vehicle.

12. The method as recited in claim 8, wherein:
   step (i) comprises pivotably coupling the first kick link to the bulkhead and to the first reaction link; and
   step (j) comprises pivotably coupling the second kick link to the bulkhead and to the second reaction link.

13. An aircraft comprising a fuselage comprising a bulkhead, an airfoil-shaped member attached to the fuselage, a control surface pivotably coupled to the airfoil-shaped member, and a control surface actuation system operatively coupled to the control surface, wherein the control surface actuation system comprises a torque shaft which is coupled to the control surface for driving rotation thereof, and a torque shaft drive system which is coupled to the torque shaft for driving rotation thereof, wherein the torque shaft drive system comprises:
   a first linear actuator comprising a first cylinder and a first piston rod end which is displaceable relative to the first cylinder;
   a first crank arm which is pivotably coupled to the first piston rod end and coupled to the torque shaft for driving rotation thereof;
   a first reaction link which is pivotably coupled to the torque shaft and to the first cylinder;
   a second linear actuator comprising a second cylinder and a second piston rod end which is displaceable relative to the second cylinder;
   a second crank arm which is pivotably coupled to the second piston rod end and coupled to drive rotation of the torque shaft;
   a second reaction link which is pivotably coupled to the torque shaft and to the second cylinder;
   a first kick link which is pivotably coupled to the first reaction link and to the bulkhead; and
   a second kick link which is pivotably coupled to the second reaction link and to the bulkhead,
   wherein the first and second linear actuators, first and second crank arms, first and second reactions links, and first second kick links are disposed inside the fuselage.

14. The aircraft as recited in claim 13, wherein the first reaction link partly overlaps the second reaction link.

15. The aircraft as recited in claim 13, wherein the first crank arm is coupled to the torque shaft at a first axial location and the second crank arm is coupled to the torque shaft at a second axial location.

16. The aircraft as recited in claim 15, wherein the first reaction link is pivotably coupled to the torque shaft at third and fourth axial locations, the second reaction link is pivotably coupled to the torque shaft at fifth and sixth axial locations, the fourth axial location is between the second and sixth axial locations, and the fifth axial location is between the first and third axial locations.

17. The aircraft as recited in claim 13, wherein a front spar of the control surface comprises first and second pluralities of splines and the torque shaft comprises third and fourth pluralities of splines which are respectively meshed with the first and second pluralities of splines.

18. The aircraft as recited in claim 13, further comprising:
   a torque shaft support fitting that is attached to a rear spar of the airfoil-shaped member outside the fuselage, wherein the torque shaft support fitting comprises an opening through which the torque shaft passes; and
   a bearing disposed in the opening in the torque shaft support fitting and configured to support the torque shaft while allowing the torque shaft to rotate.

19. The aircraft as recited in claim 17, wherein:
   the torque shaft comprises first and second torque shaft segments;
   one end of the first torque shaft segment is inside one end of the second torque shaft segment; and
   the third and fourth pluralities of splines are on an outer surface of the second torque shaft segment.

20. The aircraft as recited in claim 13, further comprising a flight control system configured to send commands to control the first and second linear actuators so that the first linear actuator extends while the second linear actuator retracts, thereby causing the first and second crank arms to rotate in a same direction.

* * * * *